United States Patent
Eskin et al.

(10) Patent No.: US 8,529,646 B2
(45) Date of Patent: Sep. 10, 2013

(54) INTEGRATED SYSTEM AND METHOD FOR PRODUCTION AND VAPORIZATION OF LIQUID HYDROCARBON FUELS FOR COMBUSTION

(75) Inventors: Leo D. Eskin, Darnestown, MD (US); Richard J. Roby, Columbia, MD (US); Michael S. Klassen, Columbia, MD (US); Michael J. Ramotowski, Columbia, MD (US)

(73) Assignee: LPP Combustion LLC, Columbia, MD (US)

( * ) Notice: Subject to any disclaimer, the term of this patent is extended or adjusted under 35 U.S.C. 154(b) by 1277 days.

(21) Appl. No.: 11/742,478

(22) Filed: Apr. 30, 2007

(65) Prior Publication Data
US 2007/0254966 A1 Nov. 1, 2007

Related U.S. Application Data

(60) Provisional application No. 60/746,136, filed on May 1, 2006.

(51) Int. Cl.
*C01B 3/24* (2006.01)
(52) U.S. Cl.
USPC .......................................... 48/127.1; 48/210
(58) Field of Classification Search
USPC .......................................... 48/197 R–197 A
See application file for complete search history.

(56) References Cited

U.S. PATENT DOCUMENTS

| | | | |
|---|---|---|---|
| 163,323 | A | 5/1875 | Martin |
| 696,909 | A | 4/1902 | McCormick et al. |
| 964,031 | A | 7/1910 | Leahy |
| 1,544,607 | A | 7/1925 | Simmons |
| 1,755,846 | A | 4/1930 | Steed |
| 2,216,178 | A | 10/1940 | Astradsson |
| 2,256,785 | A | 9/1941 | Dalen et al. |
| 2,268,603 | A | 1/1942 | Linder |
| 2,354,179 | A | 7/1944 | Blanc |
| 2,377,342 | A | 6/1945 | Holicer |
| 2,701,608 | A | 2/1955 | Johnson |
| RE24,682 | E | 8/1959 | Johnson |
| 3,229,464 | A | 1/1966 | Mock |

(Continued)

FOREIGN PATENT DOCUMENTS

| | | |
|---|---|---|
| CN | 1564859 | 1/2005 |
| CN | 1726371 | 1/2006 |

(Continued)

OTHER PUBLICATIONS

Cowell, et al., "Development of a Dual-Fuel Injection System for Lean Premixed Industrial Gas Turbines," American Society of Mechanical Engineers (Paper), 1996, ASME, New York, NY, Compendex, vol. 39, p. 3268, 1996.

(Continued)

*Primary Examiner* — Imran Akram
(74) *Attorney, Agent, or Firm* — DLA Piper LLP US

(57) ABSTRACT

A process is provided, which comprises transforming a synthesis gas into a liquid fuel, producing a fuel gas using the liquid fuel and a first gas, the first gas having an oxygen content less than that of ambient air, and contacting the fuel gas with a second gas, the second gas comprising at least one oxidizing agent, to form a combustion gas. Systems for carrying out the process are also provided.

14 Claims, 9 Drawing Sheets

(56) References Cited

U.S. PATENT DOCUMENTS

| | | |
|---|---|---|
| 3,254,695 A | 6/1966 | Brodlin |
| 3,545,902 A | 12/1970 | Bailey |
| 3,564,847 A | 2/1971 | Wagner |
| 3,568,934 A | 3/1971 | Dunn |
| 3,576,382 A | 4/1971 | Finnstrand |
| 3,597,134 A | 8/1971 | Bailey |
| 3,602,202 A | 8/1971 | Kobayashi |
| 3,603,711 A | 9/1971 | Downs |
| 3,788,065 A | 1/1974 | Markowski |
| 3,800,533 A | 4/1974 | Zankowski |
| 3,832,985 A | 9/1974 | Edde |
| 3,840,321 A | 10/1974 | Moench |
| 3,847,534 A | 11/1974 | Nomaguchi et al. |
| 3,866,585 A | 2/1975 | Kopa |
| 3,937,008 A | 2/1976 | Markowski et al. |
| 3,973,395 A | 8/1976 | Markowski et al. |
| 3,986,815 A | 10/1976 | Miyahara |
| 3,990,831 A | 11/1976 | Syska |
| 4,004,875 A | 1/1977 | Zink et al. |
| 4,008,041 A | 2/1977 | Roffe et al. |
| 4,013,396 A | 3/1977 | Tenney |
| 4,019,314 A | 4/1977 | Springmann |
| 4,023,538 A | 5/1977 | Harpman et al. |
| 4,025,282 A | 5/1977 | Reed et al. |
| 4,028,044 A | 6/1977 | Carlisle |
| 4,033,725 A | 7/1977 | Reed et al. |
| 4,040,403 A | 8/1977 | Rose et al. |
| 4,045,956 A | 9/1977 | Markowski et al. |
| 4,047,880 A | 9/1977 | Caldarelli |
| 4,058,977 A | 11/1977 | Markowski et al. |
| 4,088,437 A | 5/1978 | Holzapfel |
| 4,094,291 A | 6/1978 | Hamburg |
| 4,099,382 A | 7/1978 | Paull et al. |
| 4,114,566 A | 9/1978 | Harpman et al. |
| 4,140,473 A | 2/1979 | Hoehing et al. |
| 4,148,599 A | 4/1979 | Reed et al. |
| 4,173,254 A | 11/1979 | Paull et al. |
| 4,212,163 A | 7/1980 | Mikina |
| 4,250,704 A | 2/1981 | Bruckner et al. |
| 4,270,506 A | 6/1981 | Lowe |
| 4,289,475 A | 9/1981 | Wall et al. |
| 4,295,821 A | 10/1981 | Schilling |
| 4,302,180 A | 11/1981 | Le Mer |
| 4,318,689 A | 3/1982 | Forster et al. |
| 4,333,735 A | 6/1982 | Hardy et al. |
| 4,375,799 A | 3/1983 | Swanson |
| 4,399,079 A | 8/1983 | Lowe |
| 4,416,613 A | 11/1983 | Barisoff |
| 4,443,180 A | 4/1984 | LeFrois |
| 4,480,986 A | 11/1984 | Nelson et al. |
| 4,483,832 A | 11/1984 | Schirmer |
| 4,588,375 A | 5/1986 | Sandstrom |
| 4,606,720 A | 8/1986 | Harvey |
| 4,624,631 A | 11/1986 | Kobayashi et al. |
| 4,646,705 A | 3/1987 | Babitzka et al. |
| 4,659,743 A | 4/1987 | Rao et al. |
| 4,697,415 A | 10/1987 | Schiffers |
| 4,729,217 A | 3/1988 | Kehlhofer |
| 4,784,599 A | 11/1988 | Garbo |
| 4,838,029 A | 6/1989 | Gleason et al. |
| 4,907,565 A | 3/1990 | Bailey et al. |
| 4,909,192 A | 3/1990 | Forster et al. |
| 4,909,728 A | 3/1990 | Nakamoto et al. |
| 4,928,015 A | 5/1990 | Butler et al. |
| 5,015,173 A | 5/1991 | Fullemann et al. |
| 5,035,227 A | 7/1991 | Hansen |
| 5,138,163 A | 8/1992 | Butler et al. |
| 5,156,002 A | 10/1992 | Mowill |
| 5,165,224 A | 11/1992 | Spadaccini et al. |
| 5,207,053 A | 5/1993 | Spadaccini et al. |
| 5,238,396 A | 8/1993 | Yap |
| 5,345,756 A | 9/1994 | Jahnke et al. |
| 5,346,391 A | 9/1994 | Fullemann et al. |
| 5,359,847 A | 11/1994 | Pillsbury et al. |
| 5,377,483 A | 1/1995 | Mowill |
| 5,388,395 A | 2/1995 | Scharpf et al. |
| 5,394,686 A | 3/1995 | Child et al. |
| 5,410,869 A | 5/1995 | Muller |
| 5,417,053 A | 5/1995 | Uji |
| 5,459,994 A | 10/1995 | Drnevich |
| 5,464,344 A | 11/1995 | Hufton |
| 5,473,882 A | 12/1995 | Zarzalis et al. |
| 5,481,866 A | 1/1996 | Mowill |
| 5,572,861 A | 11/1996 | Shao |
| 5,713,195 A | 2/1998 | Bronicki et al. |
| 5,740,673 A | 4/1998 | Smith et al. |
| 5,756,360 A | 5/1998 | Harvey et al. |
| 5,775,091 A | 7/1998 | Bannister et al. |
| 5,794,431 A | 8/1998 | Utamura et al. |
| 5,806,298 A | 9/1998 | Klosek et al. |
| 5,848,885 A | 12/1998 | Tanaka et al. |
| 5,901,547 A | 5/1999 | Smith et al. |
| 5,979,183 A | 11/1999 | Smith et al. |
| 6,039,261 A | 3/2000 | Pavese |
| 6,067,789 A | 5/2000 | Dobbeling et al. |
| 6,145,294 A | 11/2000 | Traver et al. |
| 6,167,691 B1 | 1/2001 | Yoshikawa et al. |
| 6,170,264 B1 | 1/2001 | Viteri et al. |
| 6,174,160 B1 | 1/2001 | Lee et al. |
| 6,200,128 B1 | 3/2001 | Kobayashi |
| 6,220,034 B1 | 4/2001 | Mowill |
| 6,282,901 B1 | 9/2001 | Marin et al. |
| 6,341,486 B2 | 1/2002 | Hannemann et al. |
| 6,343,462 B1 | 2/2002 | Drnevich et al. |
| 6,350,116 B1 | 2/2002 | Herrmann |
| 6,408,612 B2 | 6/2002 | Hannemann et al. |
| 6,430,915 B1 | 8/2002 | Wiant et al. |
| 6,434,925 B2 | 8/2002 | Hannemann et al. |
| 6,499,991 B1 | 12/2002 | Usami et al. |
| 6,508,053 B1 | 1/2003 | Ha et al. |
| 6,579,086 B2 | 6/2003 | Fullemann et al. |
| 6,588,212 B1 | 7/2003 | Wallace et al. |
| 6,596,780 B2 | 7/2003 | Jahnke et al. |
| 6,632,085 B1 | 10/2003 | Suzuki et al. |
| 6,718,794 B2 | 4/2004 | Brugerolle et al. |
| 6,779,333 B2 | 8/2004 | Gerhold |
| 6,910,335 B2 | 6/2005 | Viteri et al. |
| 6,923,642 B2 | 8/2005 | Sennoun et al. |
| 6,928,821 B2 | 8/2005 | Gerhold |
| 6,932,594 B2 | 8/2005 | Weclas et al. |
| 6,978,619 B2 | 12/2005 | Blomeyer |
| 7,089,745 B2 | 8/2006 | Roby et al. |
| 7,322,198 B2 | 1/2008 | Roby et al. |
| 7,770,396 B2 | 8/2010 | Roby et al. |
| 7,823,570 B2 | 11/2010 | Cracknell et al. |
| 2003/0131582 A1 | 7/2003 | Anderson et al. |
| 2004/0065088 A1 | 4/2004 | Viteri et al. |
| 2004/0134194 A1 | 7/2004 | Roby et al. |
| 2004/0170936 A1 | 9/2004 | Weclas et al. |
| 2004/0177617 A1 | 9/2004 | Frutschi et al. |
| 2004/0216465 A1 | 11/2004 | Sheppard et al. |
| 2004/0247499 A1 | 12/2004 | Matsuoka et al. |
| 2006/0127827 A1 | 6/2006 | Yoshida et al. |
| 2006/0149423 A1* | 7/2006 | Barnicki et al. .............. 700/286 |
| 2006/0154189 A1 | 7/2006 | Ramotowski et al. |
| 2007/0125091 A1 | 6/2007 | Roby et al. |
| 2008/0115502 A1 | 5/2008 | Roby et al. |
| 2009/0031968 A1 | 2/2009 | Cracknell et al. |
| 2009/0084082 A1 | 4/2009 | Martin et al. |
| 2010/0300063 A1 | 12/2010 | Palmer et al. |
| 2010/0300103 A1 | 12/2010 | Roby et al. |

FOREIGN PATENT DOCUMENTS

| | | |
|---|---|---|
| DE | 43 26 802 | 12/1995 |
| DE | 197 28 151 | 1/1999 |
| DE | 100 10 546 | 9/2000 |
| DE | 101 27 043 | 6/2001 |
| EP | 0 575 043 A2 | 12/1993 |
| EP | 0 877 156 | 11/1998 |
| JP | 56-160515 | 12/1981 |
| JP | 58-71987 | 4/1983 |
| JP | 62-108911 | 5/1987 |
| JP | 63-80058 | 4/1988 |
| JP | 3-168505 | 7/1991 |

| | | |
|---|---|---|
| JP | 4-60307 | 2/1992 |
| JP | 06-058508 | 3/1994 |
| JP | 06-265146 | 9/1994 |
| JP | 11-30423 | 2/1999 |
| JP | 11-51312 | 2/1999 |
| JP | 2003-226884 | 8/2003 |
| JP | 2006-503259 | 1/2006 |
| WO | WO 88/03249 | 5/1988 |
| WO | 90/08962 | 8/1990 |
| WO | WO 02/099334 | 12/2002 |
| WO | WO 2005/054657 | 6/2005 |

OTHER PUBLICATIONS

Davis, L.B., et al., "Dry Low NOx Combustion Systems for GE Heavy-Duty Gas Turbines," GE Power Systems, GER-3568G, Oct. 2000.
Gillispie, et al., "Effects of Fuel Gas Mixtures on Power Limits in a Dual-Fuel Engine," Natural Gas and Alternative Fuels for Engines American Society of Mechanical Engineers, Internal Combustion Engine Divisional (Publication) ICE, Compendex, vol. 30, p. 2794, 1994.
Hoffmann, S., et al., "Further Development of the Siemens LPP Hybrid Burner," ASME-IGTI 98-GT-552, Stockholm, Sweden, Jun. 1998.
Lefebvre, A.H., "Gas Turbine Combustion," Emissions, Thermal Sciences and Propulsion Center School of Mechanical Engineering Purdue University, undated.
Stoffel, B., et al., "Conversion of Liquid to Gaseous Fuels for Lean Premixed Combustion," American Society of Mechanical Engineers (Paper), 1995, ASME, Presented at the International Gas Turbine and Aeroengine Congress and Exposition, Houston, Texas, Jun. 5-8, 1995.
Turns, S.R., "An Introduction to Combustion Concepts and Applications," Second Addition, Chapter I, Propulsion Engineering Research Center and Department of Mechanical and Nuclear Engineering, The Pennsylvania State University, McGraw Hill, undated.
Wei, et al., "Experimental Investigation of the Prevaporized Premised (vpl) Combustion Process for Liquid Fuel Lean Combustion," Chemical Engineering and Processing, Compendex, vol. 57, p. 198, 2001.
International Search Report issued in corresponding PCT/US07/67891 dated May 1, 2007.
Stoffel, et al., "Conversion of Liquid to Gaseous Fuels for Lean Premixed Combustion," Presented at the International Gas Turbine and Aeroengine Congress and Exposition, Houston, TX, Jun. 5-8, 1995 (10 pages).
Wei, et al., "Experimental Investigation of the Prevaporized Premixed (vpl) Combustion Process for Liquid Fuel Lean Combustion," Chemical Engineering and Processing, vol. 41, pp. 157-164 (2002).
Office Action issued in CA 2,501,862, mailed May 8, 2009.
Office Action issued in MX/a/2007/006899, mailed May 30, 2011.
Partial English translation of Office Action issued in MX/a/2007/006899, mailed May 30, 2011.
International Search Report issued in International Application No. PCT/US2003/32423, mailed Aug. 17, 2004.
Philip C. Malte et al., "The Staged Prevaporizing—Premixing Injector; High Pressure Evaluation," AGTSR Subaward No. 0-01-SR087, Final Report from the University of Washington, Dec. 2002.
"Summary Health Statistics for U.S. Adults: National Health Interview Survey, 2001," Vital and Health Statistics, Series 10, No. 218, Jan. 2004.
Marty Ahrens, "The U.S. Fire Problem Overview Report Leading Causes and Oterh Pttems and Trends," NFPA, Fire Analysis and Research Division, Jun. 2003.
International Search Report issued in PCT/US2005/04414, dated Nov. 1, 2006.
Written Opinion issued in PCT/US2005/04414, dated Nov. 1, 2006.
International Preliminary Report on Patentability issued in PCT/US2005/04414, dated Jun. 13, 2007.
Japanese Office Action issued in JP 2005-501180, mailed Jun. 16, 2009.
English translation of Japanese Office Action issued in JP 2005-501180, mailed Jun. 16, 2009.
Enlgish language abstract of JP 11-051312, published Feb. 26, 1999.
Machine Enlgish language translation of JP 11-051312, published Feb. 26. 1999.
English language abstract of JP 56-160515, published Dec. 10, 1981.
Office Action issued in CN 200380105739.9, dated Nov. 17, 2006.
English translation of Chinese Office Action issued in CN 200380105739.9, dated Nov. 17, 2006.
Office Action issued in AU 2003284124, dated Oct. 29, 2008.
Office Action issued in KR 10-2005-7006266, dated Jun. 29, 2007.
English translation of Office Action issued in KR 10-2005-7006266, dated Jun. 29, 2007.
Office Action issued in CN 200710166824.6, dated Jun. 5, 2009.
English translation of Office Action issued in CN 200710166824.6, dated Jun. 5, 2009.
Office Action issued in CN 200710166824.6, dated Jan. 8, 2010.
English translation of Office Action issued in CN 200710166824.6, dated Jan. 8, 2010.
Office Action issued in CN 200710166824.6, dated Nov. 15, 2010.
English translation of Office Action issued in CN 200710166824.6, dated Nov. 15, 2010.
Office Action issued in NZ 539362, dated May 1, 2006.
Office Action issued in CN 200580041555.X, dated Feb. 6, 2009.
English translation of Office Action issued in CN 200580041555.X, dated Feb. 6, 2009.
Office Action issued in CN 200580041555.X, dated Jan. 29, 2010.
English translation of Office Action issued in CN 200580041555.X, dated Jan. 29, 2010.
Office Action issued in CN 200580041555.X, dated Nov. 22, 2010.
English translation of Office Action issued in CN 200580041555.X, dated Nov. 22, 2010.
Written Opinion issued in PCT/US2007/067891, mailed Mar. 10, 2008.
International Preliminary Report on Patentability issued in PCT/US2007/067891, mailed Nov. 13, 2008.
Office Action issued in MX PA/a/2005/003786, mailed Jun. 4, 2010.
Partial English language translation of Office Action issued in MX PA/a/2005/003786, mailed Jun. 4, 2010.
Office Action issued in AU 2005314037, mailed Dec. 21, 2009.
Office Action issued in NZ 555544; mailed Oct. 7, 2010.
Office Action issued in MY PI 20070934, mailed Jun. 30, 2010.
Office Action issued in CN 200780015985.3, mailed Jun. 15, 2011.
Partial English language translation of Office Action issued in CN 200780015985.3, mailed Jun. 15, 2011.
English language abstract of JP 06-058508, published Mar. 1, 1994.
Machine English language translation of JP 06-058508, published Mar. 1, 1994.
English language abstract of JP 06-265146, published Sep. 20, 1994.
Machine English language translation of JP 06-265146, published Sep. 20, 1994.
English language abstract of JP 11-30423, published Feb. 2, 1999.
Machine English language translation of JP 11-30423, published Feb. 2, 1999.
English language abstract of CN 1564859, published Jan. 12, 2005.
English language abstract of JP 03-168505, published Jul. 22, 1991.
English language abstract of JP 04-60307, published Feb. 26, 1992.
English language abstract of JP 63-80058, published Apr. 11, 1988.
English language abstract of JP 62-108911, published May 20, 1987.
U.S. Appl. No. 10/682,408.
U.S. Appl. No. 11/464,441.
U.S. Appl. No. 11/929,675.
Arthur H. Lefebvre, "Gas Turbine Combustion; Second Edition", Printed by Edward brothers 1998, pp. 57-62.
Supplementary European Search Report issued in EP 03 77 6355, Mailed Aug. 4, 2011.
English language abstract of EP 0 877 156, published Nov. 11, 1998.
English language abstract of DE 100 10 546 published Sep. 7, 2000.
English language abstract of DE 43 26 802 published Feb. 2, 1995.
English language abstract of DE 197 28 151 pubslished Jan. 7, 1999.
Office Action issued in Chinese Application No. 200780015985.3, dated May 3, 2012.

English language translation Office Action issued in Chinese Application No. 200780015985.3, dated May 3, 2012.
Office Action issued in European Application No. EP 03776355.4, dated Jun. 20, 2012.
Office Action issued in Chinese Application No. 200780015985.3, dated Aug. 23, 2012.
English language translation Office Action issued in Chinese Application No. 200780015985.3, dated Aug. 23, 2012.
Office Action issued in Japanese Application No. 2009-510013, dated Dec. 4, 2012.
English language translation Office Action issued in Japanese Application No. 2009-510013, dated Dec. 4, 2012.
English language abstract of JP 2003-226884, published Aug. 15, 2003.
Machine English language translation of JP 2003-226884, published Aug. 15, 2003.
English language abstract of JP 2006-503259, published Jan. 26, 2006.
Machine English language translation of JP 2006-503259, published Jan. 26, 2006.
U.S. Appl. No. 12/851,379.
U.S. Appl. No. 11/296,426.
Office Action issued in Australian Application No. 2007258113, dated Jan. 17, 2012.

* cited by examiner

INTEGRATED SYSTEM AND METHOD FOR PRODUCTION AND VAPORIZATION OF LIQUID HYDROCARBON FUELS FOR COMBUSTION

RELATED APPLICATION DATA

This application claims priority to U.S. Provisional Application Ser. No. 60/746,136, filed May 1, 2006, the entire contents of which are incorporated herein by reference, the same as if set forth at length.

BACKGROUND

Integrated Gasification Combined Cycle (IGCC) technology couples a complex coal gasification process plant with a synthesis gas-fired combustion turbine combined cycle power plant. The IGCC process typically involves a two-stage combustion operation, which typically includes a cleanup between the stages. The first stage employs a gasifier where partial oxidation of the coal is carried out by limiting the oxidant supply. Other methods, such as steam reforming, may also be used to produce the synthesis gas. The thus-produced synthesis gas, a mixture mostly of CO and $H_2$, is then typically scrubbed to remove impurities such as sulfur, and sent to a second stage. In the second stage, the synthesis gas is burned in a combustion turbine to complete the oxidation and produce energy.

To produce the synthesis gas, sources of carbon other than coal may be used. This so-called gas turbine/combined cycle (GT/CC) technology operates equally well with a variety of carbon-containing feed stocks such as liquid and solid hydrocarbons, biomass, asphalt, tires, coke residue, and the like.

Of extreme importance to an IGCC plant is the integration of the entire system—the gasification unit and the combustion turbine. Because it is impractical to store significant quantities of synthesis gas, the combustion turbine must remain operational whenever the gasification plant is in operation. Shutting down the combustion turbine typically requires an immediate shutdown of the gasification plant. It is also difficult to run the gasification plant at only part load, and hence it is necessary to run the combustion turbine in at least a base load configuration. These are significant operating limitations.

Coal-derived synthesis gas has a very low heating value (115-125 BTU/scf LHV) compared to that of natural gas (800-1000 BTU/scf LHV). Because of this, the combustion hardware on a synthesis gas-fired combustion turbine must be substantially modified from that normally used on a natural gas-fired, combustion turbine. The cost of these modifications can be significant, adding to the cost of the plant, and creating additional maintenance issues for the operator.

Rather than burning the synthesis gas for its energy value, the synthesis gas may be converted into hydrocarbons. These so-called gas-to-liquid (GTL) and coal-to-liquid (CTL) processes are well known. Several methods are available to carry out the conversion. The Fischer-Tropsch process is but one example in which CO and $H_2$ are catalyzed into hydrocarbons. Hydrocarbons produced by the Fischer-Tropsch process include $C_1$-$C_{200}$ or higher, with most being in the range of about $C_1$-$C_{50}$.

In the past 15 years, however, liquid fuels have not been the fuels of choice for combustion turbines. This is because of the higher levels of pollution typically associated with burning liquid fuels compared to burning gaseous fuels such as natural gas. Liquid fuels are traditionally burned in non-premixed (or diffusion) mode, which leads to regions of relatively high temperature within the combustor. Since non-premixed combustion can increase the amounts of pollutants such as NOx, premixed combustors have been developed for gas turbines. These allow for greater control of the temperature field in the combustor. In addition, the practice of introducing water or steam into the combustor to reduce emissions of NOx compounds when burning liquid fuels in non-premixed mode also has a detrimental effect on the efficiency and lifetime of the combustion turbine hardware.

U.S. Pat. No. 7,089,745, the contents of which are hereby incorporated by reference, discloses a system for vaporization of liquid fuels for combustion and method of use.

DESCRIPTION OF THE SEVERAL EMBODIMENTS

Figure 1:
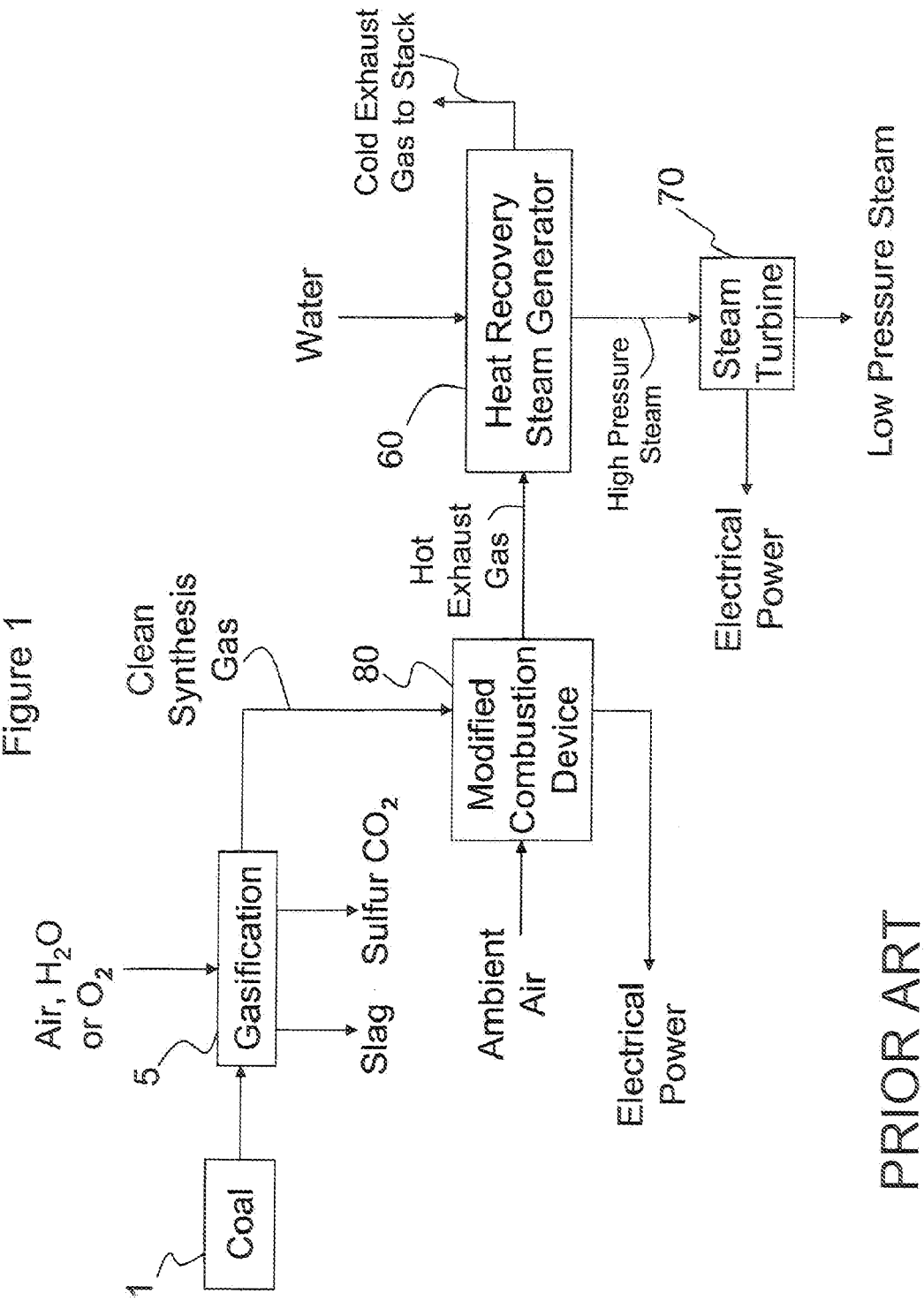
FIG. 1 shows a block diagram of a prior art IGCC plant.
Figure 2:
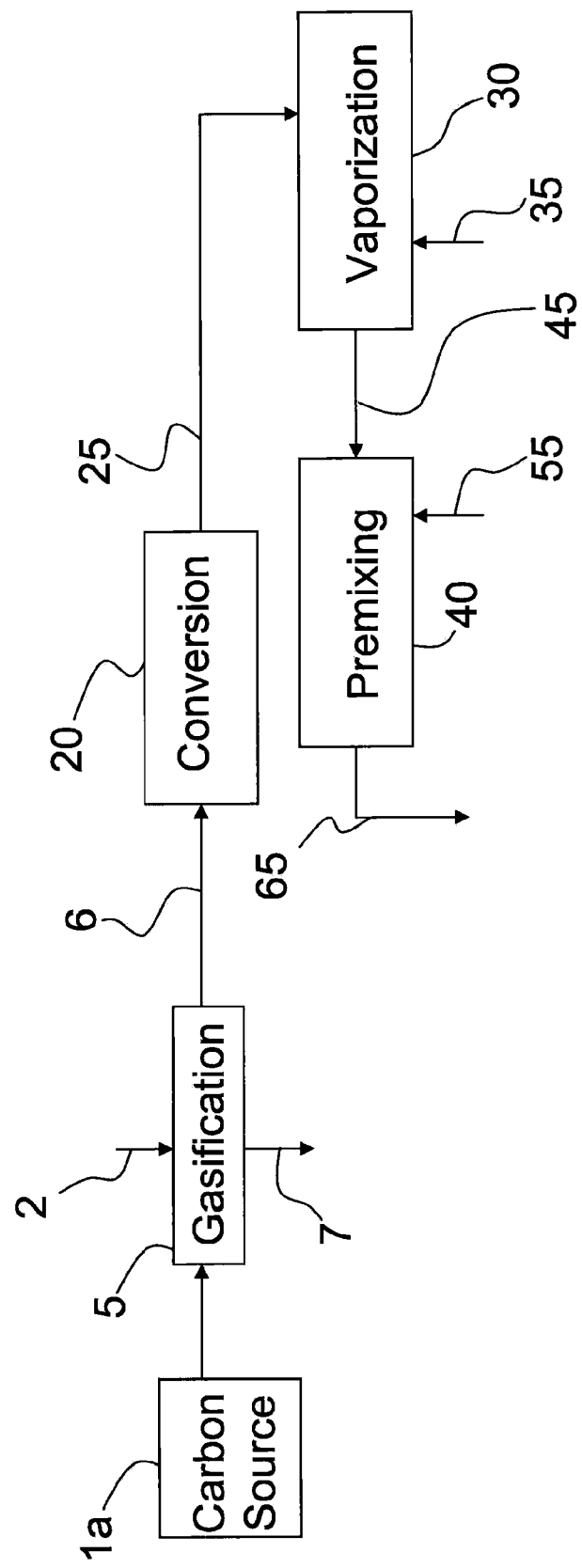
FIG. 2 shows a block diagram of one embodiment of the invention.

One embodiment of the present invention, shown in FIG. 2, provides a process, comprising transforming a synthesis gas 6 into a liquid fuel 25, producing a fuel gas 45 using the liquid fuel 25 and a first gas 35, the first gas 35 having an oxygen content less than that of ambient air, and contacting the fuel gas 45 with a second gas 55, the second gas 55 comprising at least one oxidizing agent, to form a combustion gas 65. A carbon source 1a is sent to a gasification unit 5, in which $O_2$, air, $H_2O$, $CO_2$, or a combination thereof 2 are introduced. Impurities 7 may be removed, and synthesis gas 6 is formed. The synthesis gas 6 is transformed into liquid fuel 25 in the conversion unit 20. A fuel gas 45 is produced in vaporization unit 30 using the liquid fuel 25 and a first gas 35, the first gas 35 having an oxygen content less than that of ambient air. The fuel gas 45 is contacted with a second gas 55 in the premixing unit 40, the second gas 55 comprising at least one oxidizing agent, to form a combustion gas 65.

The combustion gas 65 may be formed prior to arriving at a flame front (not shown) in a combustion device 50 (premixed mode) or at a flame front in a combustion device 50 (non-premixed mode).

The carbon source 1a is not particularly limited. In addition to coal 1, other carbon sources 1a may be used. Some examples of carbon sources 1a from which synthesis gas 6 may be produced include one or more of coal, lignite, brown coal, anthracite, sub-bituminous coal, particulate carbon, fossil fuels, solid hydrocarbons, liquid hydrocarbons, residual oil, low API gravity fuel oil, tar sand oil, shale oil, VacResid, petroleum coke, petroleum bottoms, asphalt, API asphalt, coke residue, natural gas, wax, waste, bitumen, ORIMULSION™ (aqueous emulsion of bitumen), biomass, carbohydrates, cellulosistics, peat, corn, straw, wood, wood residues, manure, sewage sludge, rice hulls, rice straw, oat hulls, pine tree bark, tires and/or tire derived fuel, furfural residue, oat hulls, switchgrass, olive waste, sansa, whole tree waste, sugar cane bagasse, undigested dried sewage sludge, digested dried sewage sludge, carpet manufacturing selvage, post consumer carpet, chicken litter, turkey litter, laminate flooring dust, urban green waste, pulp sludge, corn stover, ethanol plant dried distiller's grains, and the like, and mixtures thereof.

The gasification unit 5 is not particularly limited so long as it converts the carbon source 1a into synthesis gas 6. The gasification unit 5 may be a fixed bed, fluidized bed, circulating fluidized bed or entrained flow type. In the gasification unit 5, the carbon source 1a is combined with a feed 2 of $O_2$, air, $H_2O$, steam, $CO_2$, or a combination thereof. Although not shown, in one embodiment, the $O_2$ feed 2 for the gasification unit 5 may be produced in an air separator unit (ASU), as is well known. Converting the carbon source 1a can include one or more of partial oxidation, catalytic partial oxidation, steam reforming, autothermal reforming, $CO_2$ reforming, water gas shift, pressure swing adsorption, or a combination thereof.

As shown in FIG. 2, impurities 7 such as slag, mercury, alkaline metals, solids, soot, dust, ash, sulfur, acid gas, $H_2S$, COS, $NH_3$, HCN, HBr, HCl, HF, $CS_2$, and the like can be removed or recovered for value. Other components such as $CO_2$, $H_2O$, $CH_4$, $N_2$, paraffins, ethane, propane, and olefins, ethane, propene, tars, organic compounds, and the like may be removed and/or recovered for value if desired. Methods of removing these are known in the art. The synthesis gas 6 can also include the so-called "biosyngas", produced from the gasification of biomass. The thus produced synthesis gas 6, which is predominantly a mixture of $H_2$ and CO, may be clean and dry for supplying to the conversion unit 20. In this regard, the gasification unit 5 and the conversion unit 20 are fluidly connected.

As shown in FIG. 2, the synthesis gas 6 may be sent to conversion unit 20 and transformed into liquid fuel 25, Methods for transforming synthesis gas 6 into hydrocarbons are well known. In one embodiment, the conversion unit 20 comprises a Fischer-Tropsch reactor. The Fischer-Tropsch ("FT") process is but one example in which CO and $H_2$ are catalyzed into hydrocarbons. FT products and products made from similar reactions between CO and $H_2$ include $C_1$-$C_{200}$ or higher hydrocarbons, with most being in the range of about $C_1$-$C_{50}$, straight chain, high boiling hydrocarbons, medium boiling oils, diesel oil, green diesel, L-P gas, naphtha, kerosene, jet fuel, JP-5, JP-8, JP-4, oil #1, fuel oil #2, oxygenated compounds, coal liquids, tailgas, wastewater, and the like, and mixtures thereof.

The type of Fischer-Tropsch reactor for conversion unit 20 such as shown in FIG. 2 is not particularly limited. Some examples of FT reactors include tubular fixed bed reactors, Arge reactors, Sasol advanced synthol (SAS) reactors, Sasol slurry phase distillate (SSPD) reactors, high temperature Fischer-Tropsch (using a fluidized catalyst at 300-330° C.), low temperature Fischer-Tropsch (using tubular fixed bed reactors at 200-230° C.), entrained bed reactors, fixed-fluidized bed reactors, and slurry bubble column reactors.

In one embodiment, not shown, the tailgas, which may arise as a byproduct of the FT or similar process, and which may contain one or more of CO, $H_2$, $CO_2$, $CH_4$, $C_2H_6$, $H_2O$, $N_2$, Ar and other gaseous hydrocarbons, may be recovered for value or recycled to one or more units or steps herein as appropriate. In another embodiment, one or more of the above components of the tailgas may be recovered for value or recycled to one or more units or steps herein.

So long as they are derived from synthesis gas, many liquid fuels 25 are suitable for use in the system and process described herein. The term, "liquid fuel" should be understood to include hydrocarbons that are normally in a liquid state at ambient conditions, as well as gaseous hydrocarbons that have been liquified by cooling and/or pressurization. Such liquid fuels 25 may comprise one or more liquid and/or liquified gaseous hydrocarbons, liquified natural gas with elevated higher hydrocarbon content, liquified $C_2$, $C_3$, $C_4$, liquid $C_5$, $C_6$, $C_7$, $C_8$, $C_9$, and higher hydrocarbons, straight chain medium and high boiling hydrocarbons, "higher hydrocarbon fuel" having at least 50% by weight of the hydrocarbon molecules have at least two carbons, diesel, green diesel, L-P gas, naphtha, kerosene, jet fuel, JP-5, JP-8, JP-4, fuel oil #1, fuel oil #2 oxygenated compounds, coal liquids, and the like, and mixtures thereof. In one embodiment, the liquid fuel 25 includes hydrocarbons that are normally in a liquid state at ambient conditions. In another embodiment, the liquid fuel 25 includes gaseous hydrocarbons that have been liquified by cooling and/or pressurization. In yet another embodiment, the liquid fuel 25 includes a mixture of hydrocarbons that are normally in a liquid state at ambient conditions and gaseous hydrocarbons that have been liquified by cooling and/or pressurization.

As shown in FIG. 2, the liquid fuel 25 is sent to a vaporization unit 30. A fuel gas 45 is produced in the vaporization unit using the liquid fuel 25 and a first gas 35. In the vaporization unit 30, the liquid fuel 25 is contacted with and mixes with the first gas 35. The liquid fuel 25 is also vaporized. The order in which the contact and vaporization occurs is not particularly limited. In some embodiments, the contact and vaporization occur simultaneously, such as when the first gas 35 is pre-heated to a temperature sufficient to vaporize the liquid fuel 25. In other embodiments, the liquid fuel 25 is partially or completely vaporized, e.g., by heating the liquid fuel 25 prior to contacting the first gas 35. In some embodiments, the first gas 35 is pressurized and/or heated prior to contact and vaporization. An example of a suitable vaporization unit 30 is described in U.S. Pat. No. 7,089,745, already incorporated herein by reference.

Although not shown in FIG. 2, in one embodiment, the liquid fuel 25 can be sent to and stored in a storage vessel for a period of time prior to sending it to the vaporization unit 30. In another embodiment, not shown in FIG. 2, the liquid fuel 25 can be transported by truck, rail, pipeline, or ship to the vaporization unit 30. In another embodiment, the liquid fuel 25 can be sent to the vaporization unit 30 via a combination of storage vessel and transport by truck, rail, pipeline or ship. In another embodiment, the liquid fuel 25 is fed directly to the vaporization unit 30. In this regard, the conversion unit 20 is fluidly connected to vaporization unit 30.

The first gas 35 has an oxygen content less than that of ambient air. In one embodiment, the first gas 35 has an oxygen content of less than about 21% $O_2$ at ambient temperature and pressure. In one embodiment, the first gas 35 has an $O_2$ content of zero or substantially zero to less than about 21% at ambient temperature and pressure. This range includes all values and subranges therebetween, including 0, substantially zero, 1, 2, 3, 4, 5, 6, 7, 8, 9, 10, 11, 12, 13, 14, 15, 16, 17, 18, 19, 20 and less than about 21%.

In one embodiment, the first gas 35 has an $O_2$ content below the limiting oxygen index. The limiting oxygen index (LOI) is the concentration of oxygen in the local environment below which a material will not support combustion and varies for different types of liquid fuels. The LOI is typically between about 10% and about 14% and is approximately 13% for many higher hydrocarbon fuels. In one embodiment, the first gas 35 has an $O_2$ content below 14%. This includes all values and subranges therebetween, including below 14, 13, 12, 11, 10, 9, 8, 7, 6%, and below.

Limiting the amount of oxygen in the first gas 35 will delay or suppress the onset of autoignition. The more the oxygen content of the first gas 35 is reduced, the more autoignition is suppressed or delayed. However, more work (i.e., energy) is required to produce a gas stream with a lower oxygen content, which reduces the overall efficiency of the system. Thus, in some embodiments, the oxygen content in the first gas 35 is sufficiently low to suppress or delay autoignition.

In one embodiment, the oxygen content in the first gas 35 is sufficiently low such that combustion of the fuel gas 45 is not supported. In one embodiment, the oxygen content in the first gas 35 is sufficiently low such that autoignition of the combustion gas 65 is delayed or reduced.

So long as it contains a reduced amount of oxygen, the composition of the first gas 35 is not particularly limited. Nonlimiting examples of the first gas 35 include one or more of inert gas, nitrogen, argon, hydrogen, carbon monoxide, carbon dioxide, NOx, SOx, hydrocarbon, methane, ethane, propane, butane, ammonia, gas supplied by an air separator unit, exhaust gas, hot exhaust gas 75, cold exhaust gas 125, synthesis gas 6, or a combination thereof. In one embodiment, the first gas 35 can be supplied from one or more of the units or combustion devices herein.

In one embodiment, the first gas 35 is $N_2$ produced by an air separator unit (not shown). This provides a beneficial use of what would otherwise be a waste product. Most gasification processes use nearly pure oxygen in the partial oxidation of coal to produce synthesis gas. This oxygen is produced by an air separation unit (ASU) that separates the oxygen and nitrogen from ambient air. The nitrogen produced by the ASU is typically considered to be a waste product, and is sometimes injected into clean synthesis gas burned by a synthesis gas-fired combustion turbine in an attempt to reduce NOx emissions. However, in one embodiment it is contemplated that all or a portion of the nitrogen gas can be utilized in the first gas 35 to create the fuel gas 45. By using waste nitrogen already available from the ASU, the energy requirements of the present process are substantially reduced. It is also notable that the low NOx combustion hardware present in a natural gas-fired combustion turbine does not require the addition of supplemental nitrogen, in contrast to the hardware requirements of a synthesis gas-fired combustion turbine.

In one embodiment, one or more of the amount, pressure, temperature and composition of the first gas 35 can be metered and controlled. Methods of controlling and/or metering gases are known.

Once produced, as shown in FIG. 2, the fuel gas 45 is fed to the premixing unit 40. In the premixing unit 40, the fuel gas 45 is contacted with a second gas 55 to form a combustion gas 65.

The second gas 55 contains at least one oxidizing agent. In one embodiment, the second gas 55 contains at least one oxidizing agent in an amount sufficient to support combustion in the combustion gas 65. The oxidizing agent is not particularly limited. Non-limiting examples of oxidizing agent include ambient air, oxygen gas, nitrogen dioxide, ozone, and the like, and combinations thereof. The second gas 55 may have oxygen present in an amount equal to or greater than that of ambient air, or about 21%. This range includes all values and subranges therebetween, including 21%, greater than 21%, 22, 23, 24, 25, 26, 27, 28, 29 30, 35, 40, 50, 60, 70, 80, 90, 95, 96, 97, 98, 99, substantially 100%, and 100% oxygen ($O_2$).

In one embodiment, the second gas 55 is supplied by an ASU. In another embodiment, the second gas 55 may be ambient air. In another embodiment, the second gas 55 may be supplied by a compressor. The second gas 55 may, alternatively, be a combination of these.

Although not shown, in one embodiment, in addition to supplying the second gas 55 to the premixing unit 40 for mixing with the fuel gas 45, or, in addition to contacting the fuel gas 45 and the second gas 55 at a flame front in the combustion device 50, the oxidizing agent, compressed oxidizing agent, compressed oxygen-containing gas or oxygen can be added downstream of fuel burning in the combustion device 50. Feeding the additional oxidizing agent, for example, oxygen, into a post combustion emission stream can reduce the pollutants by enhancing the oxidation of unburned fuel and/or carbon monoxide in the exhaust stream (75 in FIG. 3).

In one embodiment, the combustion device 50 is configured to contact the fuel gas 45 with a second gas 55 at a flame front. In this way, the combustion gas 65 may be formed at the flame front. In another embodiment, when a premixing unit 40 is utilized, the combustion gas 65 is formed prior to arrival at a flame front (not shown), the flame front being in the combustion device 50. In one embodiment, the flame front occurs in a primary combustion zone (not shown) of the combustion device 50. The premixed mode, wherein the combustion gas 65 is formed prior to arriving at the flame front, may result in lower emissions of pollutants due to enhanced mixing and lower temperatures. The non-premixed mode, wherein the fuel gas 45 and second gas 55 are contacted at a flame front of the combustion device 50, may result in higher emissions of pollutants.

The combustion device 50 may be configured for either premixed mode or non-premixed mode. The combustion device 50 may be a gas turbine, for example. The combustion device may be configured for diffusion combustion, Rich Quench Lean (RQL) combustion, or a premixed combustion. When in non-premixed mode, the combustion device 50 may be configured to run in diffusion combustion mode. In these cases, a diffusion combustor is utilized. When in pre-mixed mode, the combustion device 50 may utilize a "Rich Quench Lean" ("RQL") or a premixed combustor. These types of combustors are known in the art.

The combustion gas 65 in FIG. 2 may be fed as desired to the combustion device 50.

Another embodiment provides a system, comprising a conversion unit 20 configured to transform a synthesis gas 6 into a liquid fuel 25, a vaporization unit 30 configured to produce a fuel gas 45 using the liquid fuel 25 and a first gas 35, the first gas 35 having an oxygen content less than that of ambient air, and a premixing unit 40 configured to contact the fuel gas 45 with a second gas 55, the second gas 55 comprising at least one oxidizing agent, and form a combustion gas 65. One example of this embodiment is shown in FIG. 3.

Figure 3:
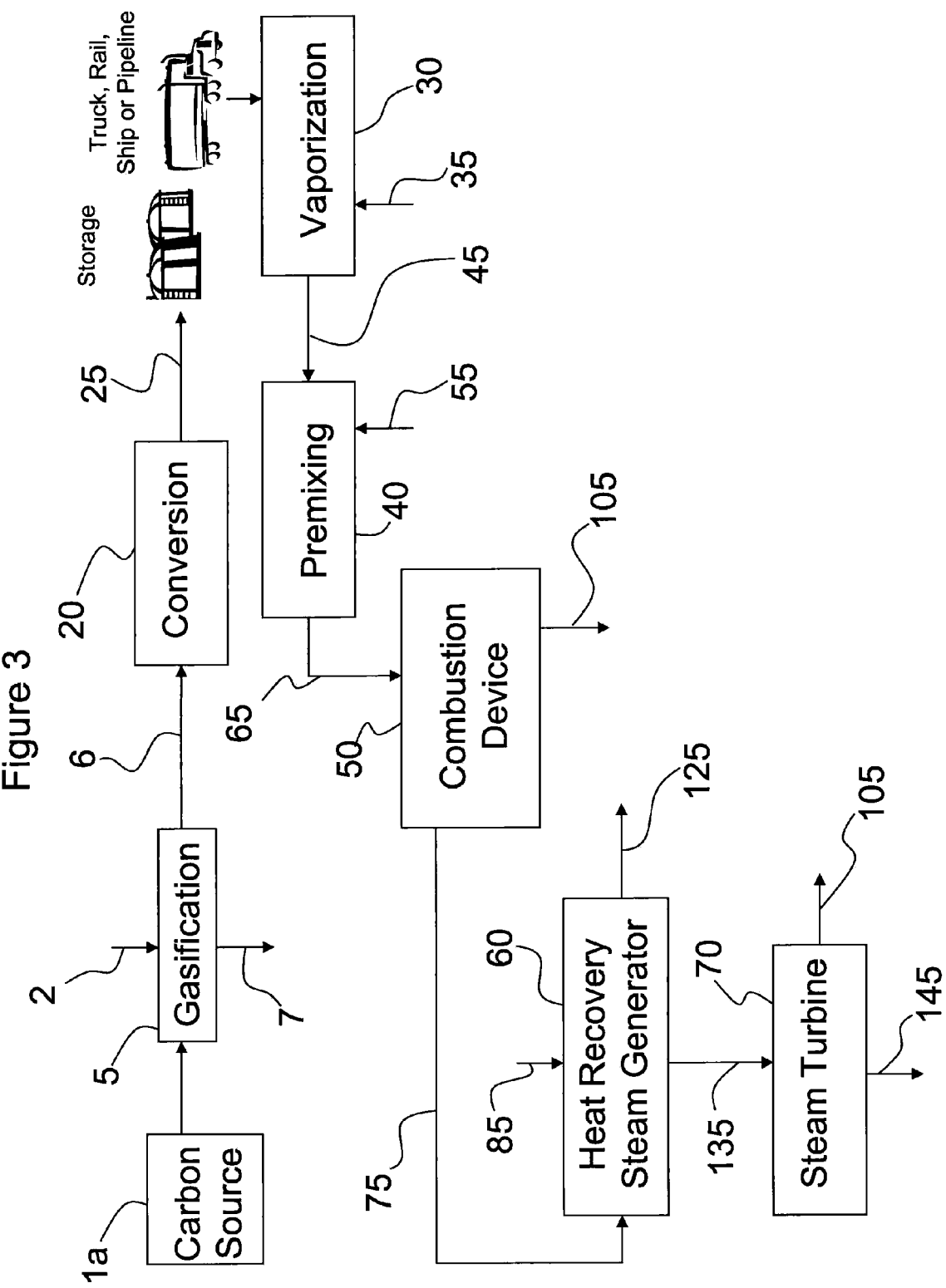
FIG. 3 shows a block diagram of another embodiment of the invention.
Figure 4:
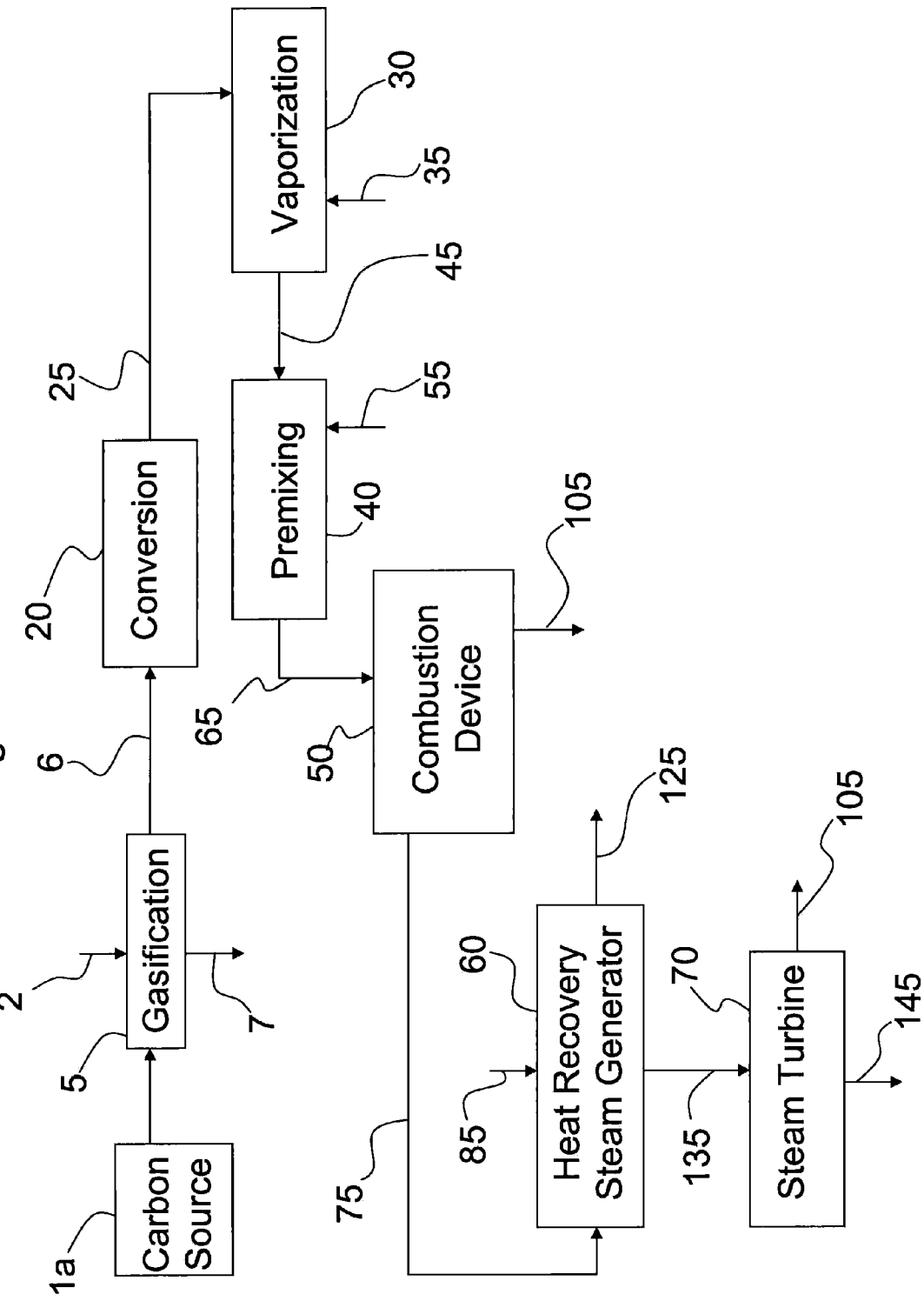
FIG. 4 shows a block diagram of another embodiment of the invention.
Figure 5:
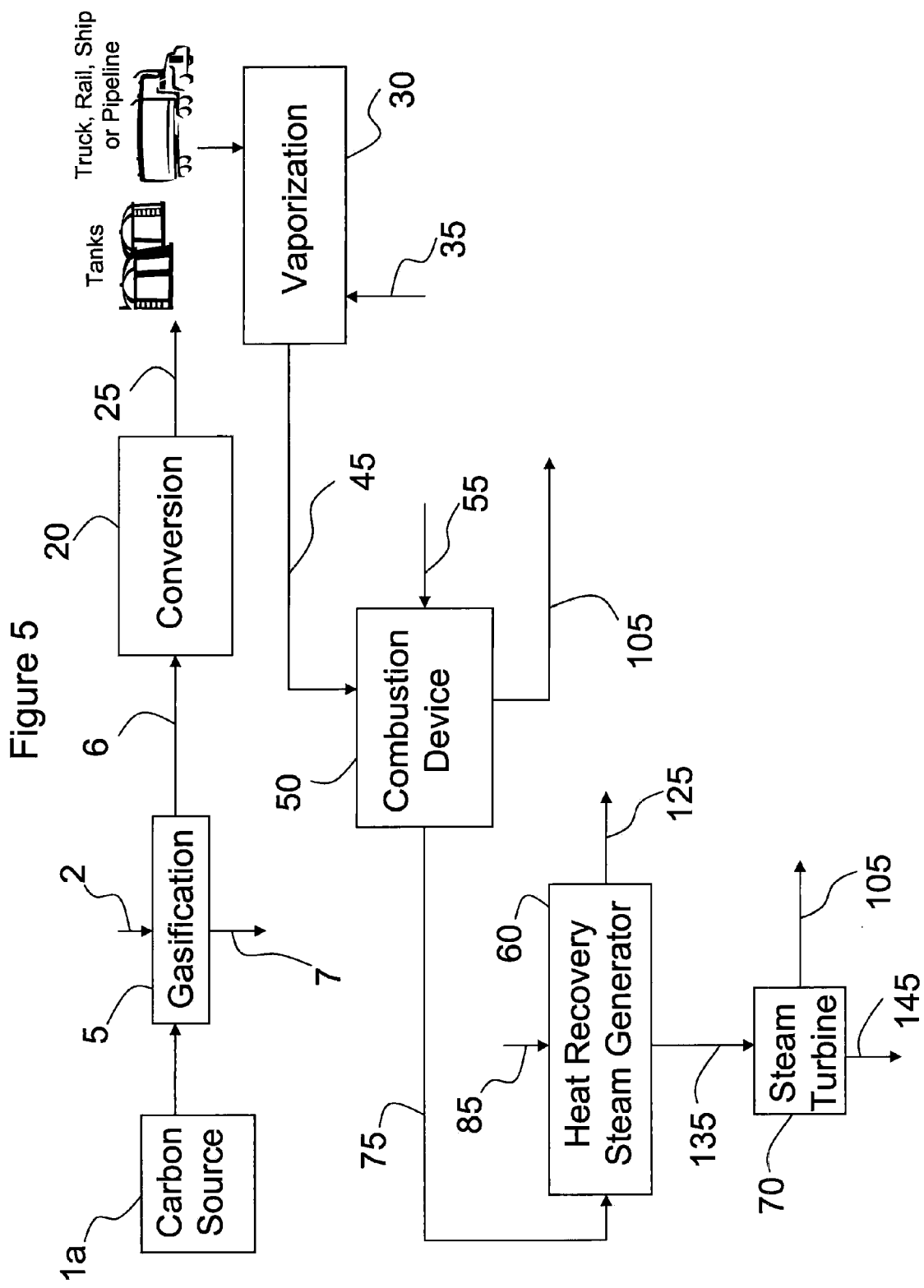
FIG. 5 shows a block diagram of one embodiment of the invention.
Figure 6:
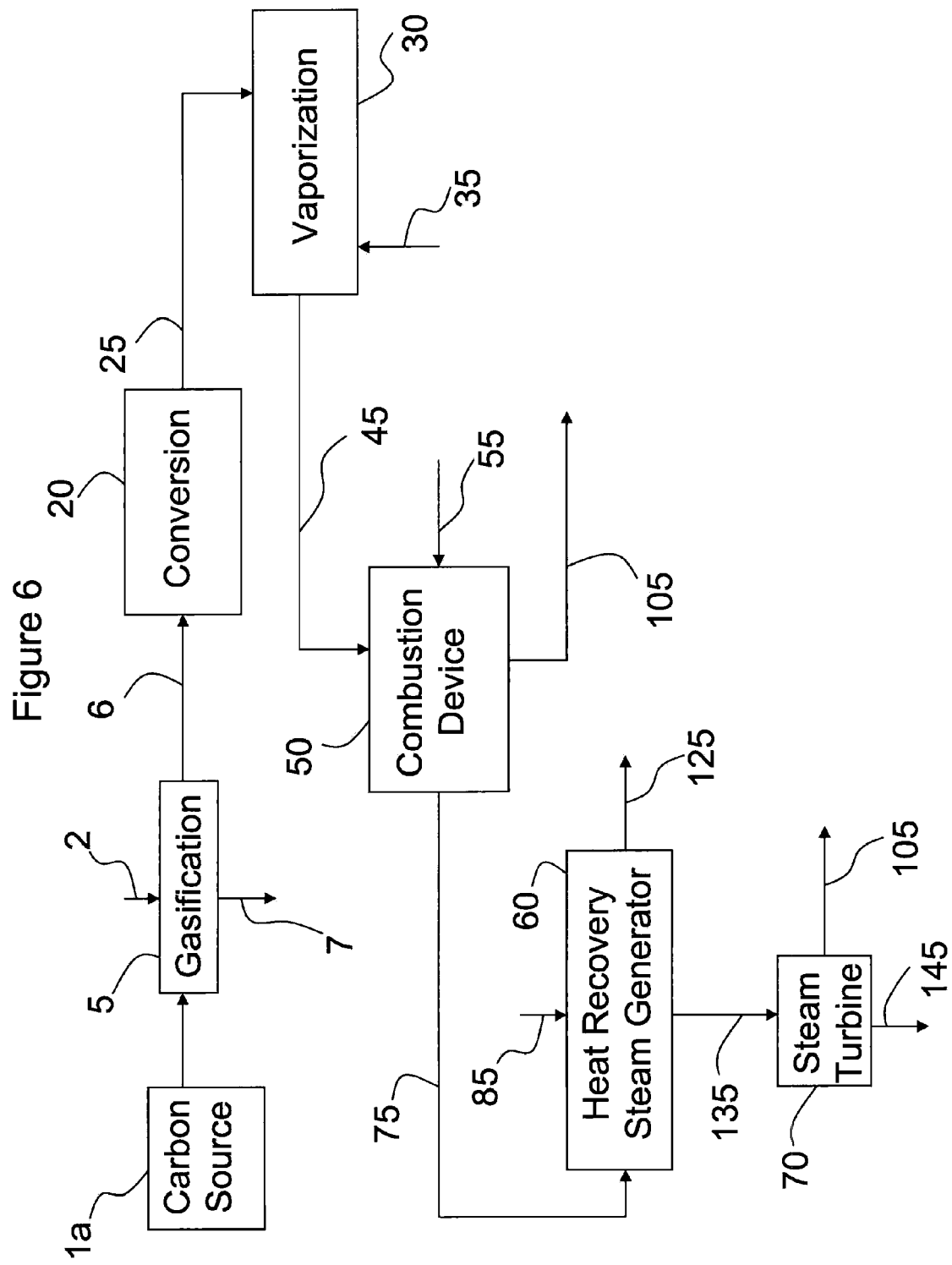
FIG. 6 shows a block diagram of another embodiment of the invention.

As shown in FIG. 3, in one embodiment, the liquid fuel 25 can be sent to and stored in a storage vessel for a period of time prior to sending it to the vaporization unit 30. In another embodiment, the liquid fuel 25 can be transported by truck, rail, pipeline, or ship to the vaporization unit 30. In another embodiment, the liquid fuel 25 can be sent to the vaporization unit 30 via a combination of storage vessel and transport by truck, rail, pipeline or ship. The liquid fuel 25 can be easily stored and shipped, and an advantage is gained in that the need for integrating the gas-to-liquid or coal-to-liquid process with the power generation process is significantly reduced. This also has the advantage of eliminating the need to co-locate the gas to liquid or coal to liquid process and the power generation process. In another embodiment, such as shown in FIG. 4, the liquid fuel 25 is fed directly to the vaporization unit 30. In this regard, the conversion unit 20 is fluidly connected to vaporization unit 30.

As shown in FIG. 3, a combustion device 50, which may be a natural gas combustion device, is fed the combustion gas 65. Electrical power 105 is produced. A hot exhaust gas 75 is fed to a heat recovery steam generator 60.

Optionally, as an alternative, all or a portion of the hot exhaust gas 75 can be utilized as the diluent gas in the first gas 35. In one embodiment, a portion of the exhaust gas 75 provides heat for the heat recovery steam generator 60, and a portion is utilized as the diluent gas in the first gas 35. In addition, the exhaust gas 75 can be used to heat or vaporize the fuel gas 45.

The heat recovery steam generator 60 heats a water feed 85 to produce high pressure steam 135 and cold exhaust 125. The cold exhaust 125 can be fed to a stack (not shown) and discarded, or it may be recycled to one or more units described herein as desired. For example, the cold exhaust may be utilized as a diluent in the first gas 35.

The high pressure steam 135 is fed to a steam turbine 70 to produce electrical power 105 and low pressure steam 145. The low pressure steam, may, if desired, be utilized in one or more units described herein. For example, the low pressure steam may be utilized in the feed 2 to gasification unit 5.

Another embodiment provides a process, comprising separating a synthesis gas 6 into first and second portions 6a and 6b, transforming the first portion 6a of synthesis gas 6 into a liquid fuel 25, producing a fuel gas 45 using the liquid fuel 25 and a first gas 35, the first gas 35 having an oxygen content less than that of ambient air, contacting the fuel gas 45 with a second gas 55, the second gas 55 comprising at least one oxidizing agent, to form a combustion gas 65, and combusting the second portion 6b of synthesis gas 6 with a modified combustion device 80. An example of a modified combustion device is a modified gas turbine 80a. One embodiment in accordance with this process is depicted in FIG. 7.

Another embodiment provides a system, comprising a separator unit 100 configured to separate a synthesis gas 6 into first and second portions 6a and 6b, a conversion unit 20 configured to transform the first portion 6a of synthesis gas 6 into a liquid fuel 25, a vaporization unit 30 configured to produce a fuel gas 45 using the liquid fuel 25 and a first gas 35, the first gas 35 having an oxygen content less than that of ambient air, a premixing unit 40 configured to contact the fuel gas 45 with a second gas 55, the second gas 55 comprising at least one oxidizing agent, and form a combustion gas 65, and a modified combustion device 80 configured to combust the second portion 6b of synthesis gas 6. One example of a modified combustion device 80, which is modified to combust synthesis gas 6, is a modified gas turbine 80a. One embodiment in accordance with this system is depicted in FIG. 7.

Figure 7:
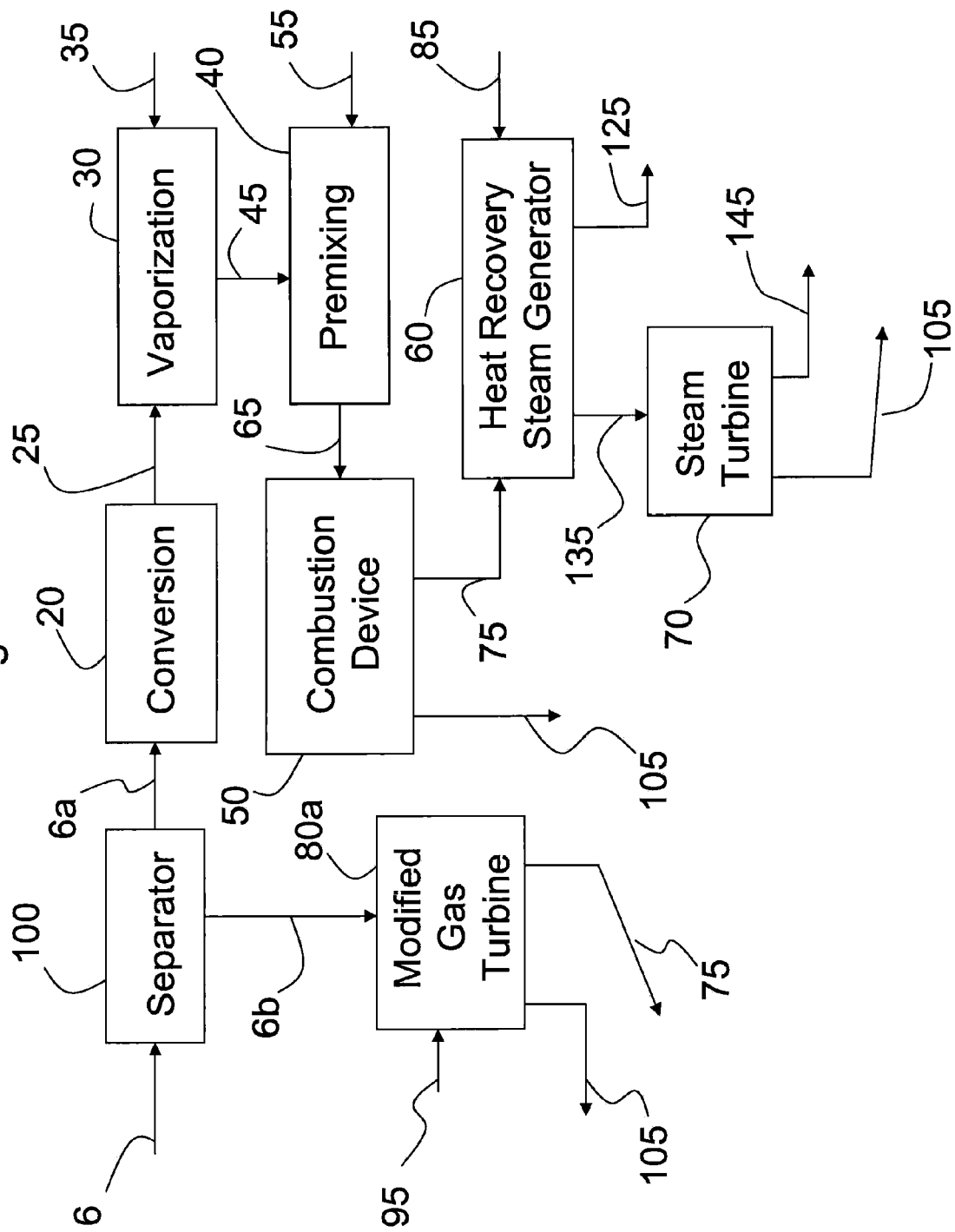
FIG. 7 shows a block diagram of another embodiment of the invention.

As shown in FIG. 7, a separator 100 is provided, which separates the synthesis gas 6 into first and second portions 6a and 6b. An advantage is gained in the polygeneration of electrical and steam power from both a synthesis gas-fired combustion device 80 and combustion fuel fired combustion device 50.

Figure 8:
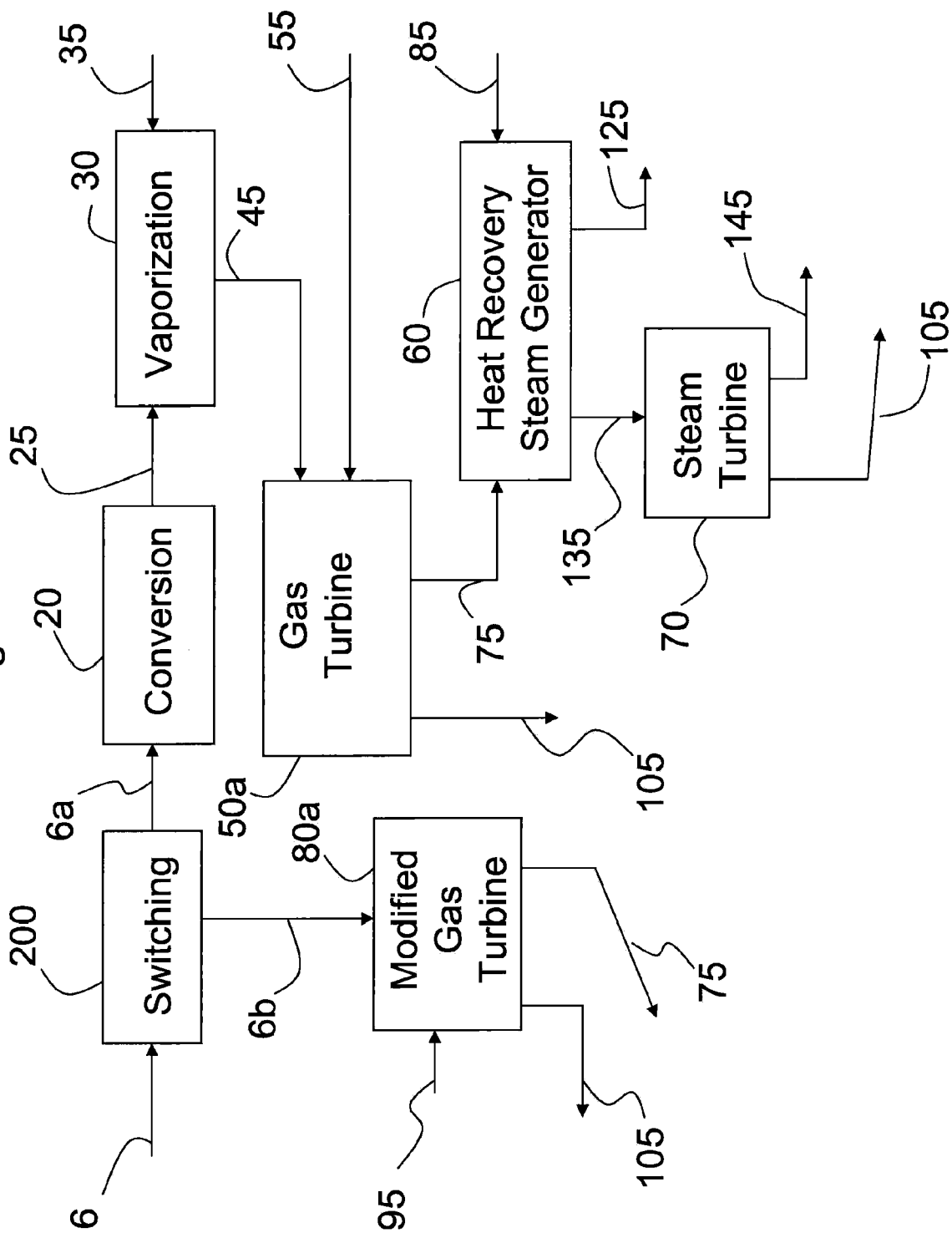
FIG. 8 shows a block diagram of another embodiment of the invention.

Another embodiment provides a system, comprising a switching unit configured to send all or a portion of a stream of synthesis gas 6 to one or both of a first combustion device and a conversion unit 20, the conversion unit 20 being configured to transform the synthesis gas 6 into a liquid fuel 25, a vaporization unit 30 configured to produce a fuel gas 45 from the liquid fuel 25 and a first gas 35, the first gas 35 having an oxygen content less than that of ambient air, and a premixing unit 40 configured to contact the fuel gas 45 with a second gas 55, the second gas 55 comprising at least one oxidizing agent, and form a combustion gas 65. An example of such a system is shown in FIG. 8.

Another embodiment provides a process, comprising sending a first stream of a synthesis gas 6 to a first combustion device for combustion, and thereafter switching all or a portion of the first stream away from the first combustion device, to produce a second stream of synthesis gas 6, transforming the second stream of synthesis gas 6 into a liquid fuel 25, producing a fuel gas 45 using the liquid fuel 25 and a first gas 35, the first gas 35 having an oxygen content less than that of ambient air, and contacting the fuel gas 45 with a second gas 55, the second gas 55 comprising at least one oxidizing agent, to form a combustion gas 65.

Another embodiment provides a process, comprising separating a synthesis gas 6 into first and second portions 6a and 6b, transforming the first portion 6a of synthesis gas 6 into a liquid fuel 25, producing a fuel gas 45 using the liquid fuel 25 and a first gas 35, the first gas 35 having an oxygen content less than that of ambient air, contacting the fuel gas 45 with a second gas 55, the second gas 55 comprising at least one oxidizing agent, to form a combustion gas 65, and combusting the second portion 6b of synthesis gas 6 with a modified combustion device 80.

Liquid fuel 25 produced by the coal-to-liquid (CTL) process are in many ways superior, in terms of combustion properties and pollutant emissions, to equivalent fuels refined from crude oil (see Table I).

TABLE I

Fischer-Tropsch Diesel Fuel Characteristics

|  | Low Sulfur D-975 | California CARB | Rentech (FTD) | EU (2005) | EPA (2006) |
| --- | --- | --- | --- | --- | --- |
| Cetane Index | >40 | >48 | 72 | >50 | >40 |
| Aromatics (vol %) | <35 | <10 | <4 | <10 | <35 |
| Sulfur (ppm) | <500 | <500* | <1 | <10 | <15 |
| Biodegradable | No | No | Yes | No | No |

Contacting the liquid fuel 25 with the first gas 35 and vaporizing (sometimes referred to herein as the LPP process) transforms the liquid fuel 25 into a fuel gas 55 (sometimes called synthetic natural gas or "LPP GAS™") which may be burned in conventional natural gas dry low emissions combustion hardware. The present process and system make it possible to avoid the need of water or steam to achieve low NOx emissions levels.

By using the synthesis gas 6 to create combustion gas 65, the gasification unit 5 would no longer require continuous or base-load operation of the combustion turbine 80. If the combustion turbine 80 load is reduced, the excess liquid fuels 25 produced would be stored as necessary in nearby tanks, or would be distributed via pipeline, truck or train, etc. If the combustion turbine 80 is shutdown altogether, the gasification and conversion units 5 and 20 could continue to operate, storing or distributing the fuel liquids 25 produced as described for part-load operation.

By the present invention, it is possible to utilize one or more conventional natural gas-fired combustion turbines, each combined with an LPP skid (or vaporization unit 30) to transform the liquid fuel 25 into LPP GAS™ which will be burned by the conventional combustion turbine. The LPP™ skid/conventional combustion turbine hardware could operate in "peaking mode" as necessary, and would allow the overall plant to respond to electrical load changes without having to change the rate of production of synthesis gas 6. The gas turbine could be operated in a combined cycle mode, as depicted in FIGS. 7 and 8, or in simple cycle configuration.

Figure 9:
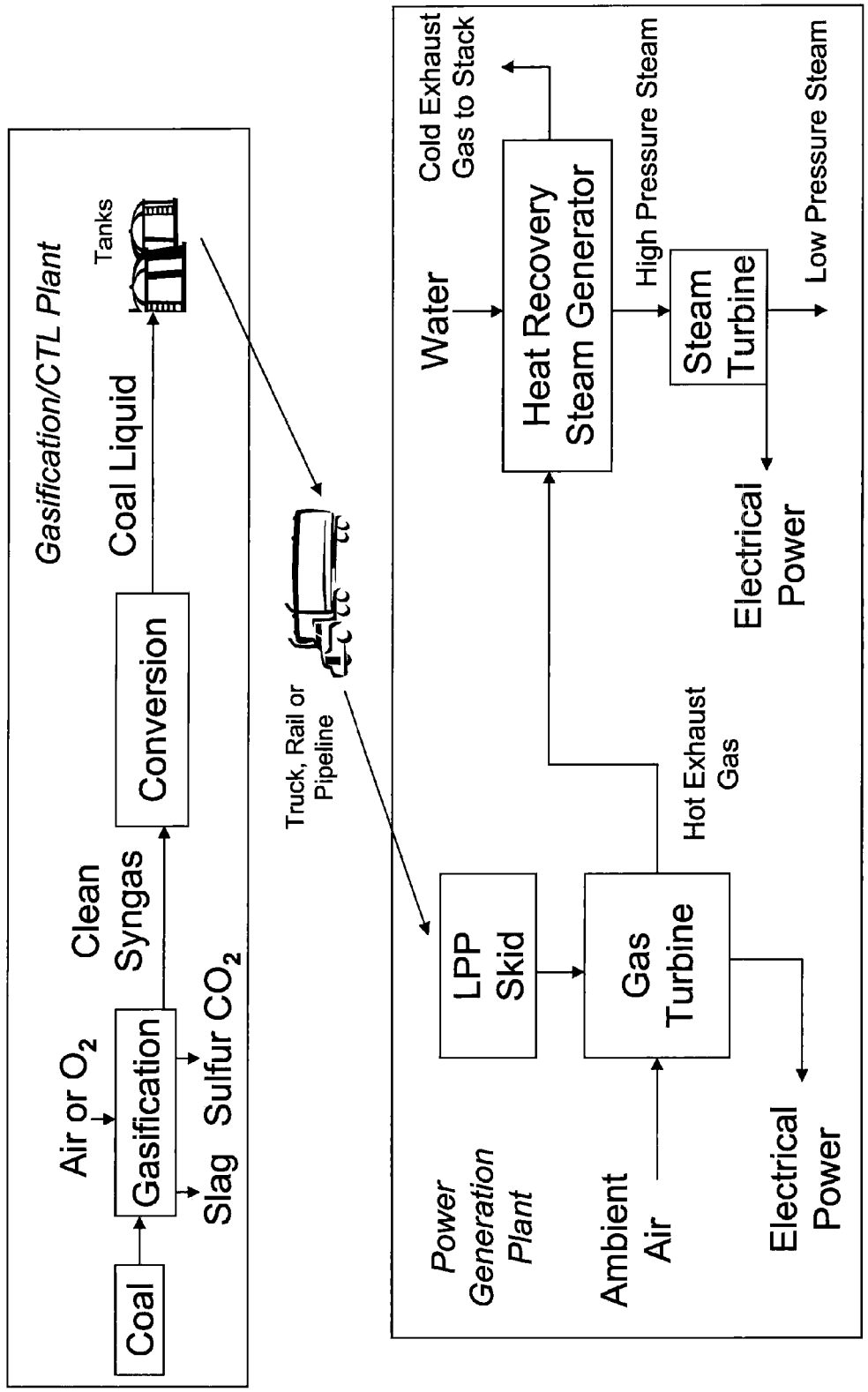
FIG. 9 shows a block diagram of another embodiment of the invention.

It is also possible to completely decouple the gasification/coal-to-liquids (CTL) plant and the power plant (see FIG. 9). The coal liquids would be produced at the gasification/CTL plant and shipped to stand-alone combustion turbines that are equipped with the LPP™ technology. This would provide the added benefit of allowing the gasification/CTL plant to be sited at any location, including a location in close proximity to the coal source. A site within close proximity to the coal source would reduce the transportation cost for the coal, and would facilitate disposal of the slag waste product resulting from the gasification plant.

By the present invention, excess coal liquids could be easily transported to stand-alone combustion turbines that include the LPP™ technology.

The present invention inheres additional advantages. It is possible to significantly reduce the plant capital cost if a spare gasifier is not needed for the coal gasification plant. The gasifier hardware portion of a coal gasification plant operates at a very high temperature and pressure. It has been found that the reliability of the gasifier hardware is such that plant economics may require that a spare gasifier be built as a "hot standby" in case the primary gasifier fails or requires maintenance. The standby gasifier is needed because there is a long lead time required to repair the gasifier, and the synthesis gas 6 produced cannot be stored for use while the gasifier is being repaired. The gasifier hardware can cost tens or hundreds of millions of dollars in a typical IGCC plant.

Another advantage is that ownership and operation of the CTL and power plants may be separated. One of the concerns with IGCC plants is that the coal gasification process is a complex chemical process for which the power industry does not have extensive experience. By the present invention, the coal gasification/CTL plant can be decoupled from the power generation plant. This allows a process plant company to own and operate the gasification/CTL plant, while a utility or independent power producer can operate a combustion turbine plant, along with the LPP™ skid.

Dry Low Emissions (DLE) systems employing lean, premixed combustion have been successfully used with natural gas in combustion turbines to meet stringent emissions standards. However, the burning of liquid fuels in DLE systems is still a challenging task due to the complexities of fuel vaporization and air premixing. In one embodiment, Lean, Premixed, Prevaporized (LPP™) combustion achieves low pollutant emissions while burning liquid fuels such as kerosene and fuel oil.

In another embodiment, the liquid fuel 25 can be produced by direct conversion methods, which avoid the use of synthesis gas intermediates and which avoid the need for conversion using FT or other processes. Accordingly, in one embodiment, these direct conversion processes may be used in place of gasification 5 and conversion 20. These direct conversion methods are known in the art.

Non-limiting examples of direct conversion methods include direct conversion of coal, solvent refining of coal, liquid solvent refining of coal, direct conversion of biomass, direct conversion of wood waste, and the like. In the direct conversion of biomass, wood waste, and the like, pyrolysis oil may be produced from the pyrolysis of biomass, wood waste, and the like in an inert atmosphere. Non-limiting examples of the types of liquid fuel 25 that result from these direct conversion methods include solvent-refined coal fuel, liquid solvent-refined coal fuel, pyrolysis oil, and the like, and combinations thereof.

KEY TO FIGURES

Coal 1
Carbon source 1a
Feed 2
Synthesis gas 6
Synthesis gas 6 first portion 6a
Synthesis gas 6 second portion 6b
Impurities 7
Conversion unit 20
Liquid fuel 25
Vaporization unit 30
First gas 35
Premixing unit 40
Fuel gas 45
Combustion device 50
Combustion turbine 50a
Second gas 55
Heat recovery steam generator 60
Combustion gas 65
Steam turbine 70
Hot exhaust gas 75
Modified combustion device 80
Modified combustion turbine 80a
Water 85
$O_2$ 95
Separator unit 100
Electrical power 105
Cold exhaust gas 125
High pressure steam 135
Low pressure steam 145
Switching unit 200

What is claimed is:

1. A process for operating an integrated gasification combined cycle (IGCC) plant, the IGCC plant comprising a gasifier for gasifying coal to produce syngas, a syngas combustion system for combusting the syngas to produce electricity, and a premixed combustion system for combusting a combustion gas other than syngas to produce additional electricity, the process comprising:
    operating the gasifier to produce synthesis gas at a substantially constant rate less than a rate sufficient for the syngas combustion system to produce enough electricity to meet a peak electrical demand;
    when a current demand for electricity is below a base load that could be produced by supplying syngas to the syngas combustion system at the substantially constant rate,
        supplying a first portion of the synthesis gas from the gasifier to the syngas combustion system sufficient to meet the current electrical demand, and
        transforming a second portion of the synthesis gas into liquid fuel and storing the liquid fuel; and
    when a current demand for electricity is above the base load that could be produced by supplying synthesis gas to the syngas combustion system at the substantially constant rate,
        supplying all of the syngas from the gasifier to the syngas combustion system to meet a first portion of the current demand,
        producing, using the liquid fuel stored when the demand for electricity was below the base load, a fuel gas by vaporizing the liquid fuel and combining it with a first gas, the first gas having an oxygen content less than that of ambient air, contacting the fuel gas with a second gas, the second gas comprising at least one oxidizing agent, to form the combustion gas, and combusting the combustion gas in the premixed combustion system to produce sufficient electricity to meet a second portion of the current demand.

2. The process of claim 1 further comprising producing the synthesis gas from a carbon source selected from the group consisting of coal, lignite, brown coal, anthracite, sub-bituminous coal, particulate carbon, fossil fuels, solid hydrocarbons, liquid hydrocarbons, residual oil, low API gravity fuel oil, tar sand oil, shale oil, VacResid, petroleum coke, petroleum bottoms, asphalt, API asphalt, coke residue, natural gas, wax, waste, bitumen, ORIMULSION™, biomass, carbohydrates, cellulosistics, peat, corn, straw, wood, wood residues, manure, sewage sludge, rice hulls, rice straw, oat hulls, pine tree bark, tires and/or tire derived fuel, furfural residue, oat hulls, switchgrass, olive waste, salsa, whole tree waste, sugar cane bagasse, undigested dried sewage sludge, digested dried sewage sludge, carpet manufacturing selvage, post consumer carpet, chicken litter, turkey litter, laminate flooring dust, urban green waste, pulp sludge, corn stover, ethanol plant dried, distiller's grains, and a mixture thereof.

3. The process of claim 1, wherein transforming the synthesis gas into liquid fuel comprises a Fischer-Tropsch process.

4. The process of claim 1, wherein the liquid fuel is vaporized before contacting it with the first gas.

5. The process of claim 1, wherein liquid fuel is vaporized by contacting it with the first gas.

6. The process of claim 1, wherein the first gas stream comprises one or more of inert gas, nitrogen, argon, hydrogen, carbon monoxide, carbon dioxide, NOx, SOx, hydrocarbon, methane, ethane, propane, butane, ammonia, gas supplied by an air separator unit, exhaust gas, hot exhaust gas, cold exhaust gas, synthesis gas or a combination thereof.

7. The process of claim 1, wherein the oxygen content in the first gas stream is sufficiently low such that combustion of the fuel gas is not supported.

8. The process of claim 1, wherein the first gas stream contains substantially no oxygen.

9. The process of claim 1, wherein the oxygen content in the first gas stream is sufficiently low such that autoignition of the combustion gas is delayed or reduced.

10. The process of claim 1, further comprising, prior to producing the fuel gas, sending the liquid fuel to a storage vessel, storing the liquid fuel in the storage vessel for a period of time, and removing the liquid fuel from the storage vessel.

11. The process of claim 1, further comprising, prior to producing the fuel gas, transporting the liquid fuel by truck, rail, pipeline, or ship, or a combination thereof.

12. The process of claim 1, wherein the combustion gas is formed prior to arrival at a flame front in a combustion device.

13. The process of claim 1, wherein the IGCC plant further comprises an air separation unit, the process further comprising:

supplying an oxygen-rich gas stream from the air separation unit to the gasifier; and using a nitrogen-rich gas stream from the air separation unit as the first gas when producing the fuel gas.

14. The process of claim 1, wherein the IGCC plant includes a single gasifier.

* * * * *